United States Patent
Allison et al.

[11] Patent Number: 6,116,674
[45] Date of Patent: Sep. 12, 2000

[54] REMOVABLE CONSOLE FOR USE WITH A VEHICLE

[75] Inventors: Johnny Hugh Allison, Plymouth Township; David Norman Denomme, Dearborn Heights; Gerald Arthur Heath, Canton; Richard Morabito, Grosse Isle, all of Mich.

[73] Assignee: Ford Motor Company, Dearborn, Mich.

[21] Appl. No.: 09/148,261

[22] Filed: Sep. 4, 1998

Related U.S. Application Data

[60] Provisional application No. 60/058,118, Sep. 5, 1997.

[51] Int. Cl.$^7$ ........................................................ B60N 3/12
[52] U.S. Cl. ................................................................ 296/37.8
[58] Field of Search ................................ 296/37.14, 37.8; 224/539, 542, 275, 926; 248/311.2; 190/18 A, 115, 117

[56] References Cited

U.S. PATENT DOCUMENTS

| | | |
|---|---|---|
| 2,722,469 | 11/1955 | Kosovsky . |
| 2,923,429 | 2/1960 | Schneider . |
| 3,321,100 | 5/1967 | Toma . |
| 3,330,611 | 7/1967 | Heifetz . |
| 4,456,141 | 6/1984 | Pamment . |
| 4,585,139 | 4/1986 | Bronson et al. . |
| 4,589,567 | 5/1986 | Pircher .................................. 220/326 |
| 4,809,897 | 3/1989 | Wright, Jr. ............................ 224/282 |
| 4,901,880 | 2/1990 | Tatham et al. . |
| 4,942,271 | 7/1990 | Corsi et al. ............................ 174/101 |
| 4,979,598 | 12/1990 | Verheij et al. . |
| 5,067,625 | 11/1991 | Numata ................................ 220/343 |
| 5,106,143 | 4/1992 | Soeters ................................. 296/37.8 |
| 5,173,992 | 12/1992 | Aihara et al. ........................... 16/232 |
| 5,210,906 | 5/1993 | Aihara et al. ........................... 16/232 |
| 5,249,438 | 10/1993 | Rhaney et al. . |
| 5,251,775 | 10/1993 | Kruzick et al. . |
| 5,297,767 | 3/1994 | Miller et al. ......................... 248/311.2 |
| 5,338,081 | 8/1994 | Young et al. ........................ 296/37.14 |
| 5,397,160 | 3/1995 | Landry ................................ 296/37.8 |
| 5,445,350 | 8/1995 | Rigsby ................................. 248/313 |
| 5,474,311 | 12/1995 | Tyciak et al. ........................... 280/30 |
| 5,527,008 | 6/1996 | Schutter et al. ..................... 248/311.2 |
| 5,542,510 | 8/1996 | Rekue et al. . |
| 5,609,382 | 3/1997 | Schmid et al. ........................ 296/37.8 |
| 5,626,391 | 5/1997 | Miller et al. ........................... 297/331 |
| 5,647,652 | 7/1997 | Zalewski et al. ...................... 312/324 |
| 5,732,994 | 3/1998 | Stancu et al. ......................... 296/37.8 |
| 5,765,894 | 6/1998 | Okazaki et al. ....................... 296/65.1 |
| 5,791,616 | 8/1998 | Volkmann et al. .................. 248/311.2 |
| 5,823,599 | 10/1998 | Gray .................................... 296/37.8 |
| 5,863,089 | 1/1999 | Ignarra et al. ........................ 296/37.8 |
| 5,897,155 | 4/1999 | Kerner et al. ........................ 296/37.8 |

FOREIGN PATENT DOCUMENTS

| | | |
|---|---|---|
| 57-198138 | 12/1982 | Japan . |
| 3189249 | 8/1991 | Japan . |

*Primary Examiner*—D. Glenn Dayoan
*Assistant Examiner*—Mickki D. Murray
*Attorney, Agent, or Firm*—Charles H. Ellerbrock

[57] ABSTRACT

A console is provided for use with an automotive vehicle. The console can be removed from or repositioned within a vehicle interior using an existing seating arrangement or seat fastening system. The console includes a variety of features, including use as a cooler or a seat separate from the vehicle. The console can be used in several positions within the vehicle.

19 Claims, 10 Drawing Sheets

REMOVABLE CONSOLE FOR USE WITH A VEHICLE

The present invention claims the priority date of copending U.S. Provisional Patent Application Serial No. 60/058,118 filed Sep. 5, 1997.

BACKGROUND OF THE INVENTION

1. Field of the Invention

The present invention relates generally to a console for use with an automotive vehicle and, more specifically, to a console which can be repositioned within or removed from the vehicle interior.

2. Description of the Related Art

Automotive vehicle consoles are well known in the art. Typically, the console is placed between the driver and front passenger seats. The console has many functions. It may operate as an arm rest, a storage unit, a writing table or cup holder. While these functions are desirable, their use is typically limited to the front passengers only. In many cases, the console opens on one side only. Thus, access to the storage compartment of the console is limited to the driver of the vehicle.

In some instances, the console may be used as a cooler or refrigeration unit. However, such use is severely limited as the console is not portable and must remain between the driver and front passenger seats, i.e., with the vehicle.

The ability to remove the console from between the driver and front passenger seats and repositioned at various locations adds to the versatility of the console and corresponding vehicle. Repositioning the console allows other passengers in the vehicle access to the console and the opportunity to take advantage of its many functions. Additionally, the ability to remove the console from the vehicle and use it in a stand-alone fashion further increases its versatility. Thus, there is a need in the art to provide a removable, portable, multi-function console that can be removed from or repositioned within the vehicle interior.

SUMMARY OF THE INVENTION

Accordingly, the present invention is a removable console for use with an automotive vehicle. The console can be removed from between the driver and front passenger seats. Once removed, the console can be either repositioned in the vehicle or removed from the vehicle entirely and used in a stand-alone fashion such as a cooler or portable storage compartment.

The console includes a compartment having a bottom, first side wall, second side wall, front end wall, and rear end wall. A lid is pivotally connected to either the first side wall or the second side wall and opens to allow access to the compartment. A rear dock pin is located on the bottom of the console. The rear dock pin includes a lock lip that cooperates with an aperture located in a floor of the automotive vehicle to secure the console to the vehicle floor. A front dock assembly is also used to secure the console to the vehicle floor. The front dock assembly includes a front dock pin pivotally connected to the bottom of the console. The front dock pin also includes a lock lip that extends through an aperture in the vehicle floor. A spring engages the front dock pin and urges the front dock pin and corresponding lock lip into engagement with the floor.

An additional feature of the present invention is the use of a lid pivotally connected to the first side wall and second side wall of the compartment wherein the lid may be opened from either side of the console. A lock connects the lid to the compartment in such a manner that the lid may be only opened on one side at a time. The lock includes a lock bar attached to the lid and extending between the first and second side walls. A lock arm having a lock shelf and lock foot having a lock lip thereon is formed on each end of the lock bar thereof. The lock lip engages a lock pin located on each of the first and second side walls.

One advantage of the present invention it its increased versatility resulting from the ability to remove the console from the vehicle and reposition it within the vehicle interior or use it as a stand-alone unit. Further, many features can be included with the console to increase its usefulness.

Other features and advantages of the present invention will be readily appreciated as the same become better understood after reading the subsequent description and when considered in connection with the accompanying drawings.

DESCRIPTION OF THE PREFERRED EMBODIMENT(S)

Figure 1:
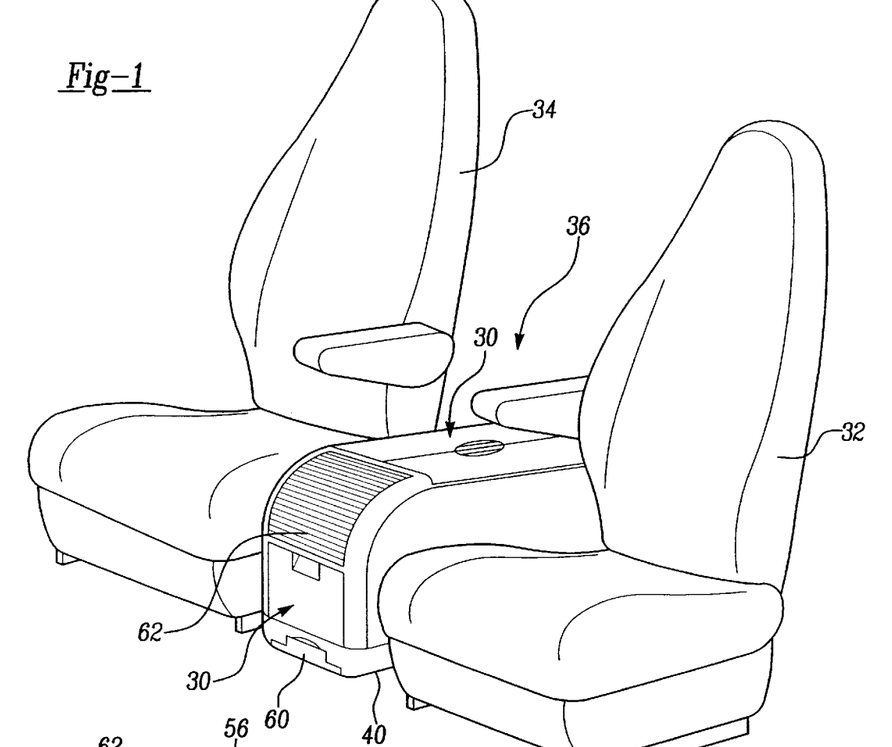
FIG. 1 is a perspective view of a console, according to the present invention, shown in use between two seats of an automotive vehicle.
Figure 2A:
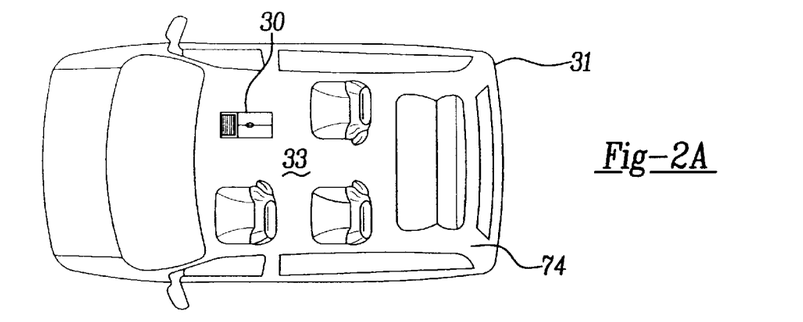
FIGS. 2a–2i are plan views illustrating various positions within the automotive vehicle interior at which the console may be located according to the present invention.
Figure 2B:
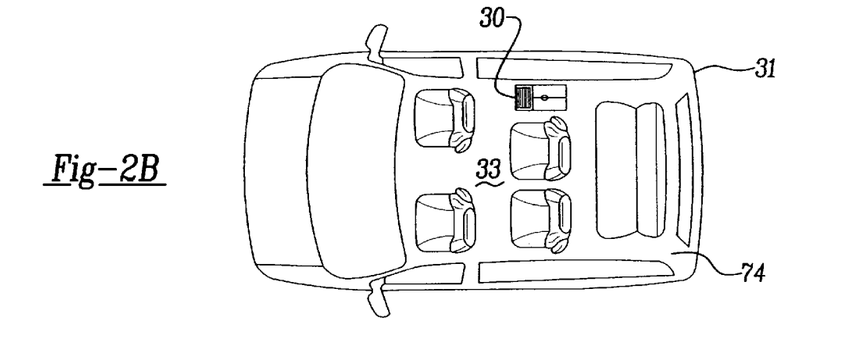
Figure 2C:
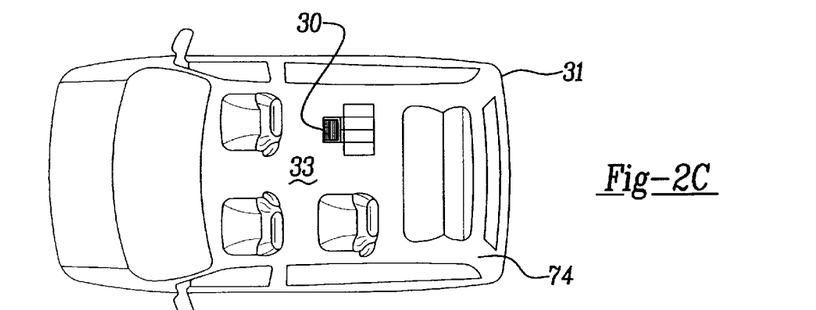
Figure 2D:
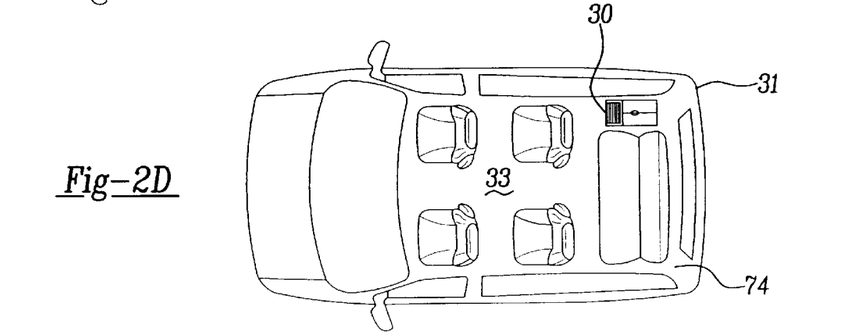
Figure 2E:
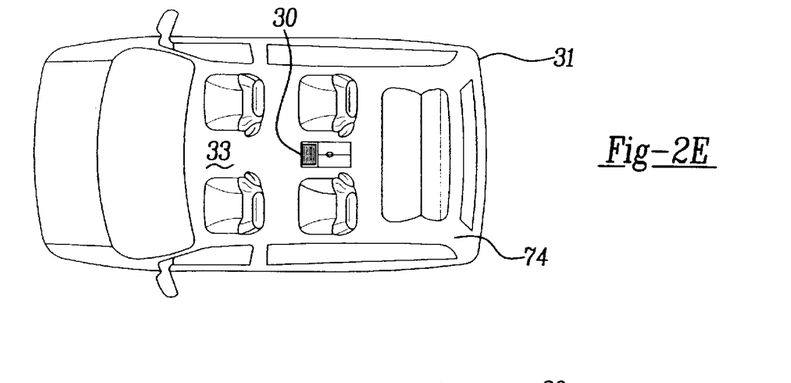
Figure 2F:
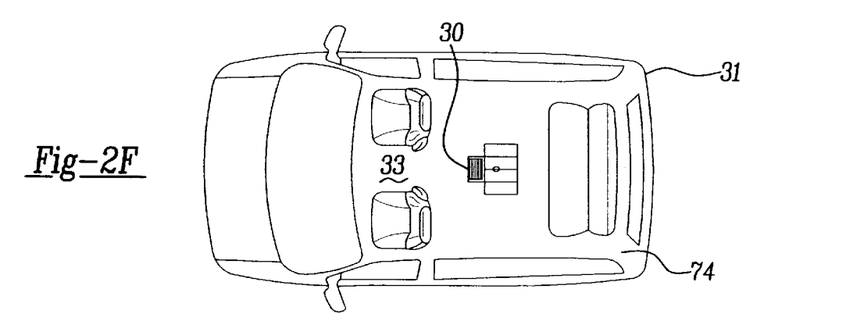
Figure 2G:
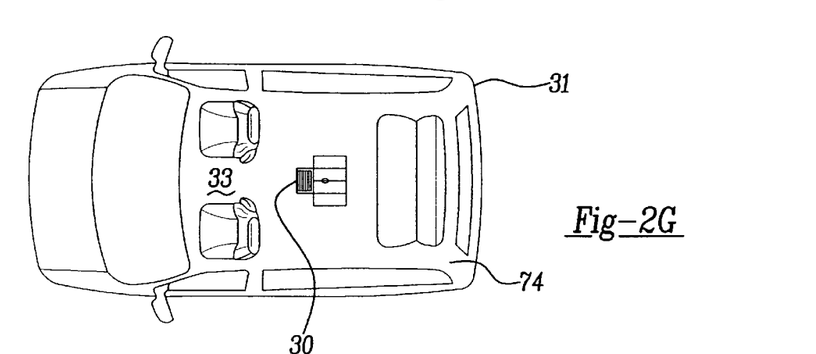
Figure 2H:
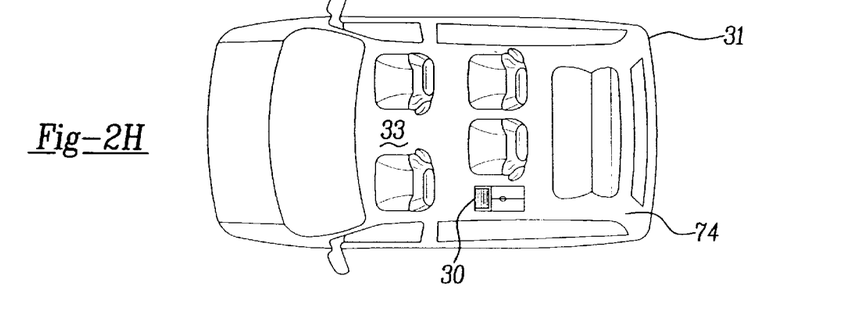
Figure 2I:
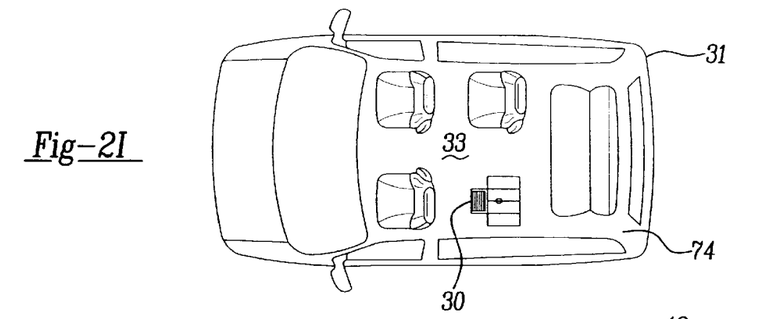

Referring to FIG. 1, one embodiment of a console 30, according to the present invention, is shown positioned between a driver seat 32 and a passenger seat 34 of an automotive vehicle 31. As shown, the console 30 is generally elongated and rectangular in shape to fit the space 36 between the seats 32 and 34.

The console 30 includes a rectangular, elongated member 38 defining a compartment 40. As shown, the compartment 40 includes a bottom 42, a first side wall 44, a second side wall 46, a front end wall 48 and a rear end wall 50. A lid 52 is connected to the compartment 40. As shown in FIGS. 1–4, the lid 52 is formed in two sections 54 and 56. Each of the sections 54, 56 are pivotally connected to a respective side wall. For example, lid section 54 is attached to first side wall 44 and lid section 56 is attached to second side wall 46. As will be explained later, the lid 52 may be hinged to anyone of the walls; i.e., first side wall 44, second side wall 46, front end wall 48, or rear end wall 50, of the compartment 40. Attaching the lid 52 in this manner enables the lid 52 to be opened in any one of four directions; i.e., front to back or side to side, thereby allowing access from any point adjacent the console 30.

Figures 3, 4:
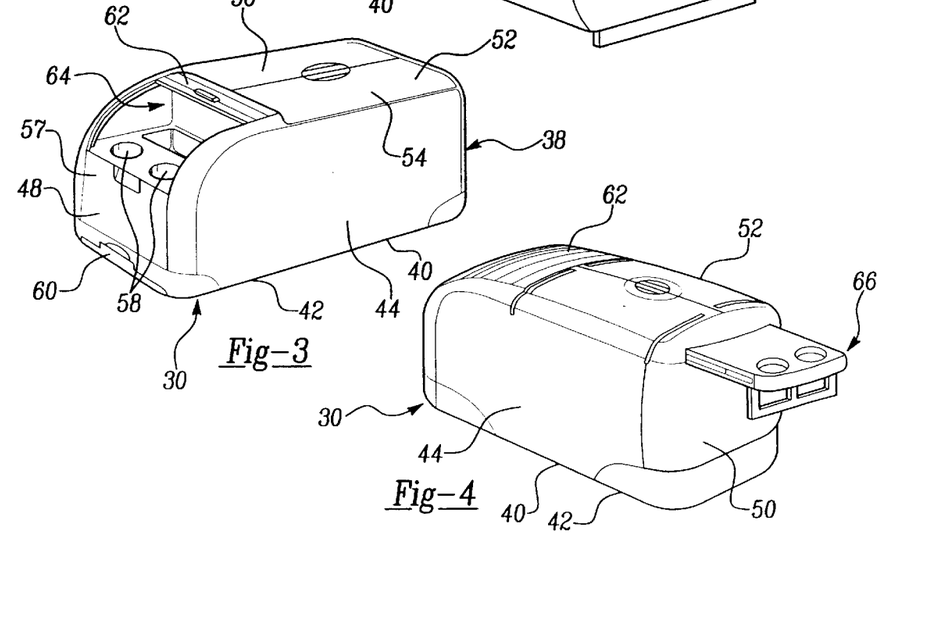
FIG. 3 is a perspective view of the console, according to the present invention, showing optional accessories that may be used with the console.
FIG. 4 is a perspective view of the console, according to the present invention, showing an optional cup holder.

As shown in FIG. 2, the console 30 may be positioned in various places within an interior 33 of the automotive vehicle 31. Specifically, FIGS. 2a–2i disclose various seating arrangements and console 30 positions that may be achieved when using the console 30. FIGS. 1–4 show different functions or features formed or included with the console 30. For instance, FIG. 3 discloses a pair of front cup holders 58 formed in a secondary compartment 64, a retractable handle 60, and a roll door 62 (see FIG. 1). FIG. 3 also illustrates a storage tray 57 positioned below the front cup holders 58. Turning to FIG. 4, a retractable cup holder, seen generally at 66, is shown. The cup holder 66 is positioned, and stored when not in use, in the rear end wall 50 of the console 30.

Figures 5, 6, 7, 8:
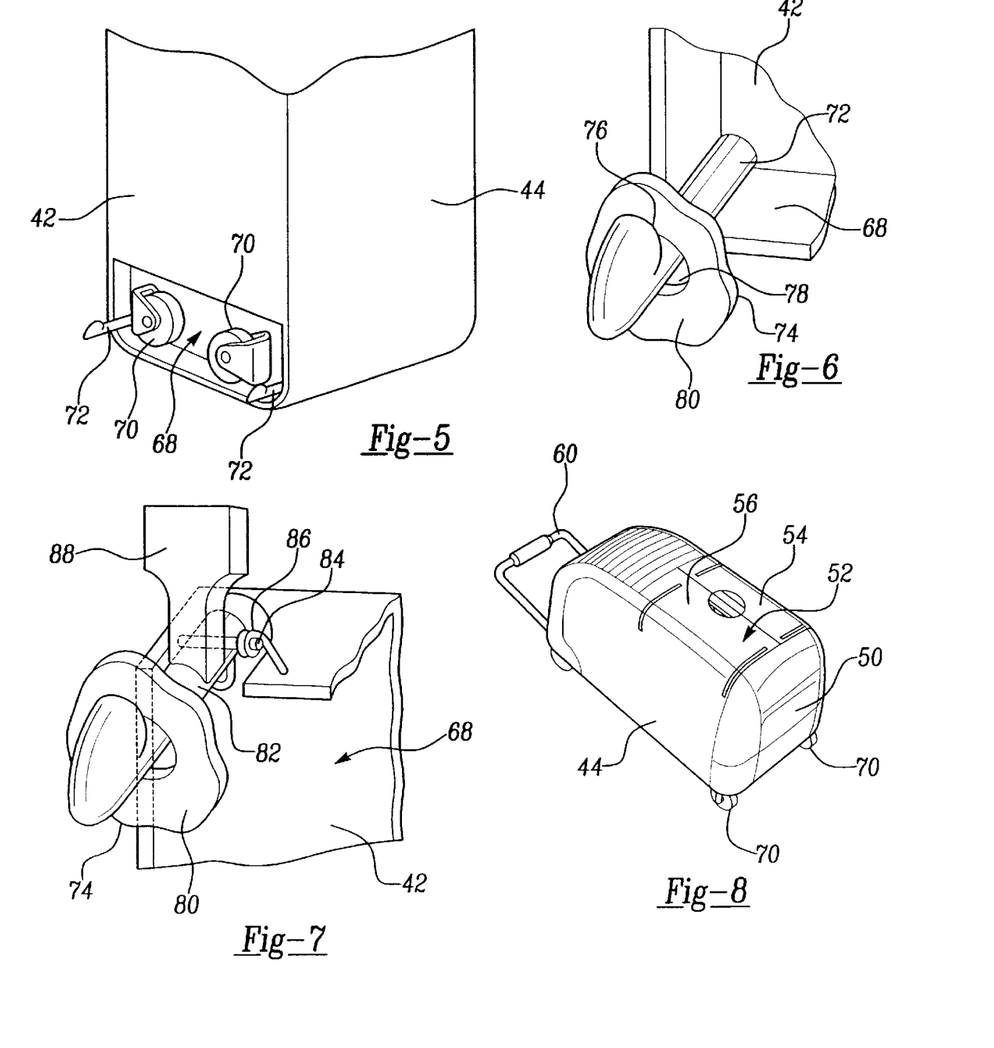
FIG. 5 is a partial, perspective view showing the bottom of the console, according to the present invention.
FIG. 6 is an enlarged perspective view of a rear dock pin of the console, according to the present invention, engaging the floor of a vehicle.
FIG. 7 is an enlarged perspective view of a front dock pin of the console, according to the present invention, shown engaging the floor of a vehicle.
FIG. 8 is a perspective view of the console, according to the present invention, having a retractable handle attached thereto.

Turning now to FIG. 5, the bottom 42 of the console 30 is shown. The bottom 42 includes a cavity 68. A pair of spring loaded wheels 70 are mounted to the bottom 42 of the console 30 in the cavity 68. Adjacent the wheels 70 are rear dock pins 72. The rear dock pins 72 lock the console 30 to the floor 74 of the automotive vehicle 31. As shown in FIG. 5, the wheels 70 fold up into the cavity 68 when the console 30 is locked in position on the vehicle floor 74. However, when the console 30 is removed from the automotive vehicle 31, the wheels 70 spring outward to the position shown in FIG. 8 so that the console 30 may be easily transported using the retractable handle 60.

FIG. 6 illustrates a rear dock pin 72 having a lock lip 76 that passes through an aperture 78 in the floor 74 of the automotive vehicle 31. Typically, the aperture 78 in the floor 74 is a seat mount hole through which the vehicle seats are mounted. The lock lip 76 engages a lock surface 80 formed in the floor 74. In the preferred embodiment, the lock surface 80 is the bottom side of a seat mount hole used to mount and retain the vehicle seats. FIG. 7 illustrates the front dock pin 82 which is similar in design to the rear dock pin 72. The front dock pin 82 is pivotally connected, through a pivot pin 84, to the bottom 42 of the console 30. A spring 86 acts on the front dock pin 82 to urge the front dock pin 82 to swing forward. A pedal 88 is attached to the front dock pin 82 and when the pedal 88 is pushed downward it causes the front dock pin 82 to move rearward allowing the front dock pin 82 to be lifted out of the hole 78. Pushing the console 30 rearward releases the rear dock pins 72 allowing the console 30 to be removed from the floor 74. It should be appreciated that the use of front 82 and rear 72 dock pins allows the seat locating holes to be used to secure the console 30 to the floor 74.

Figure 9:
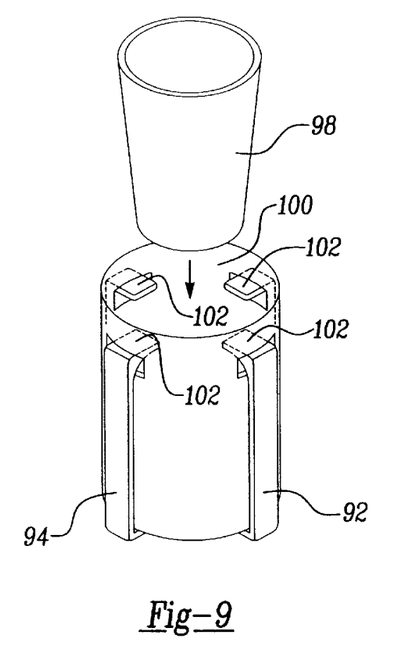
FIG. 9 is a perspective view of a cup holder for use with the console, according to the present invention.
Figure 9A:
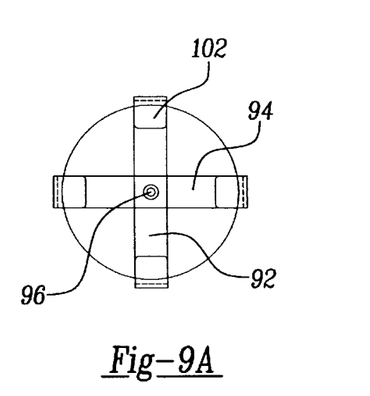
FIG. 9a is a top view of the cup holder of FIG. 9.

FIGS. 9 and 9a show the cup holder 58 used in the front or secondary compartment 64 of the console 30. The cup holder 58 includes a cylindrical member 90 having two unshaped arms 92, 94 that flex radially outward to accommodate various cup sizes. The u-shaped arms 92, 94 are secured at the bottom by a rivet 96. It should be appreciated that as a cup 98 is inserted in the direction shown by the arrow 100 into the cup holder 58, the fingers 102 of the unshaped arms 92, 94 deflect radially outward and engage the cup 98 to hold the cup 98 in place.

Figure 10:
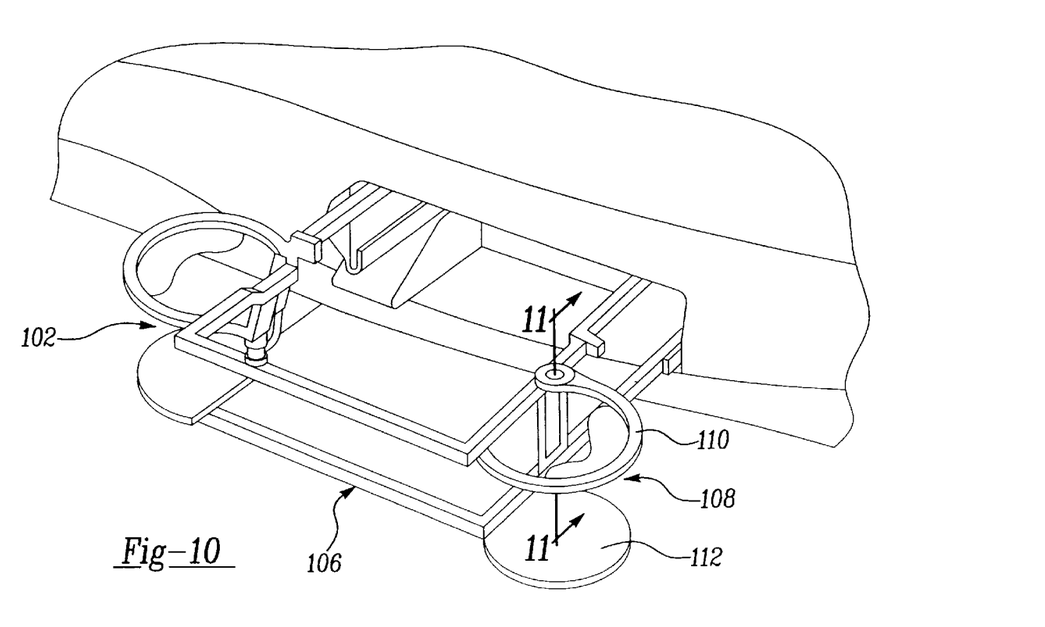
FIG. 10 is a perspective view of a type of cup holder for use with the console, according to the present invention.
Figures 11, 12, 13, 14:
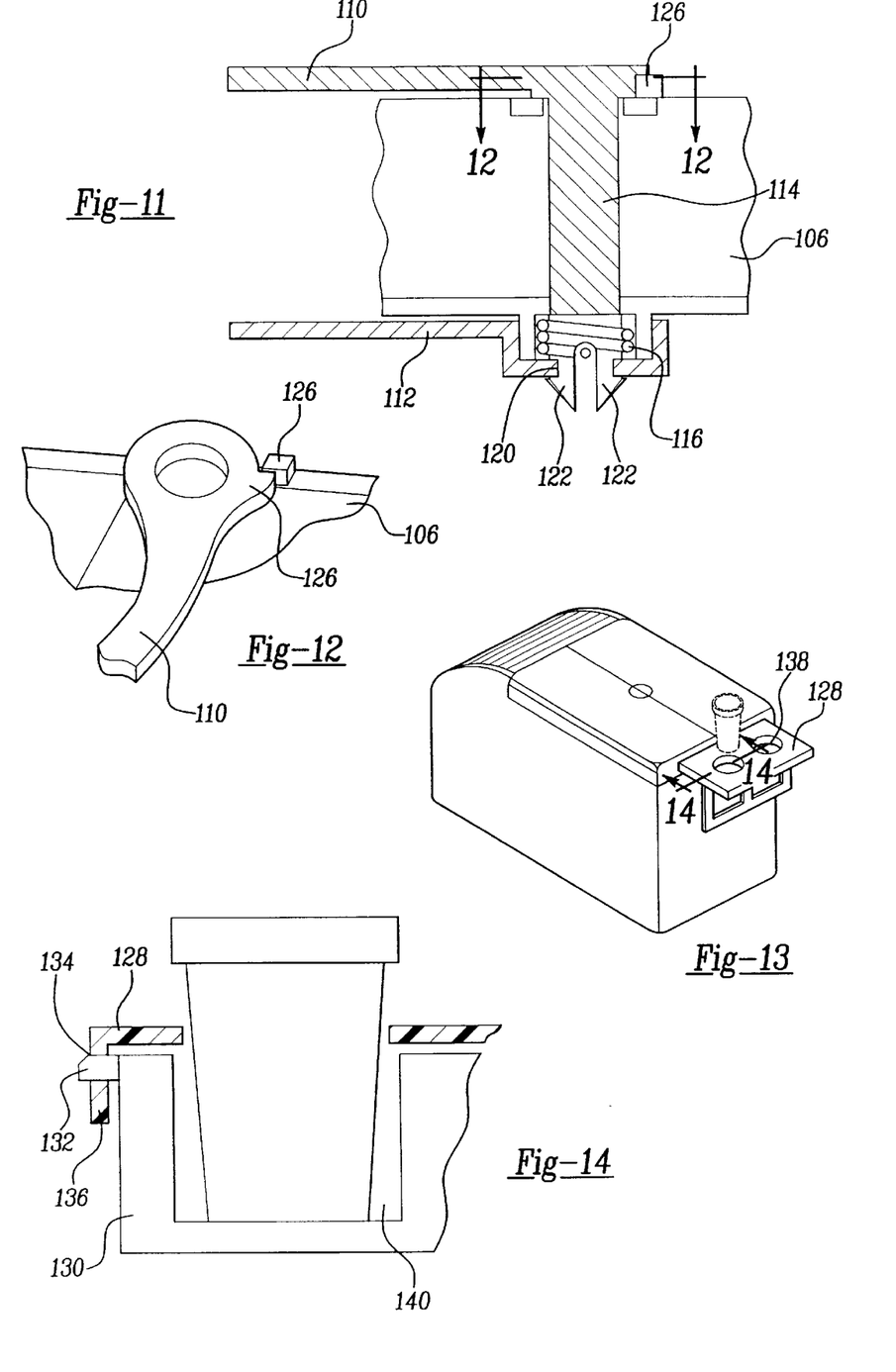
FIG. 11 is a cross-sectional view of the cup holder of FIG. 10 taken along lines 11—11.
FIG. 12 is a partial, perspective view of the arm of the cup holder of FIG. 10 taken along lines 12—12 of FIG. 11.
FIG. 13 is a perspective view of the console, according to the present invention, having a cup holder attached thereto.
FIG. 14 is a cross-sectional view of the cup holder of FIG. 13 taken along lines 14—14.

FIG. 10 discloses a further embodiment of a cup holder 104 for use with the console 30. The cup holder 104 includes a frame, seen generally at 106, slidably mounted within the console 30 for movement between a retracted, closed position within the console 30 and an extended, open position wherein the cup holder 104 extends outwardly from the console 30. The cup holder 104 includes a carrier 108 having an arcuate upper arm 110 and a lower base plate 112. Both the arcuate upper arm 110 and the lower base plate 112 are attached to a center pivot post 114 (see FIG. 11). A spring 116 is attached to the center post 114 through a slot 118. The spring 116 urges the carrier 108 outward when the frame 106 extends to its open, extended position. As shown in FIG. 11, the center pivot pin 114 snaps into a hole 120 in the lower base plate 112 and sandwiches the spring 116 between the lower base plate 112 at the bottom and the frame 106 at the top. Snap holders 122 on the center pivot post 114 flex inwardly allowing them to pass through the hole 120 and spring outward to hold the carrier 108 in place. Turning to FIG. 12, the arcuate upper arm 110 includes a stop flange 124 that engages a stop 126 located on the frame 106 to stop or limit the outward movement of the arcuate upper arm 110 when the cup holder 104 is fully opened.

FIGS. 13 and 14 show in detail the retractable cup holder 66. The cup holder 66 is a swing-down type including a rear tray 128. The tray 128 is slidably mounted on a pair of tracks formed in the console 30. The tray 128 moves between a first, extended position and a second, retracted position. A downwardly extending flange 136 is positioned at an edge of the tray 128. The flange 136 has apertures 134 therein. A downwardly extending plate member 130 having a pair of pins 132 on adjacent edges thereof is secured to the tray 128 through pins 132 engaging the apertures 134. As shown in FIG. 13, the tray 128 includes an opening 138 therein and the plate member 130 includes a cup support cutout 140 wherein the cup support cutout 140 is aligned with the opening 138 to support a cup positioned in the cup holder 66.

Figures 15, 16:
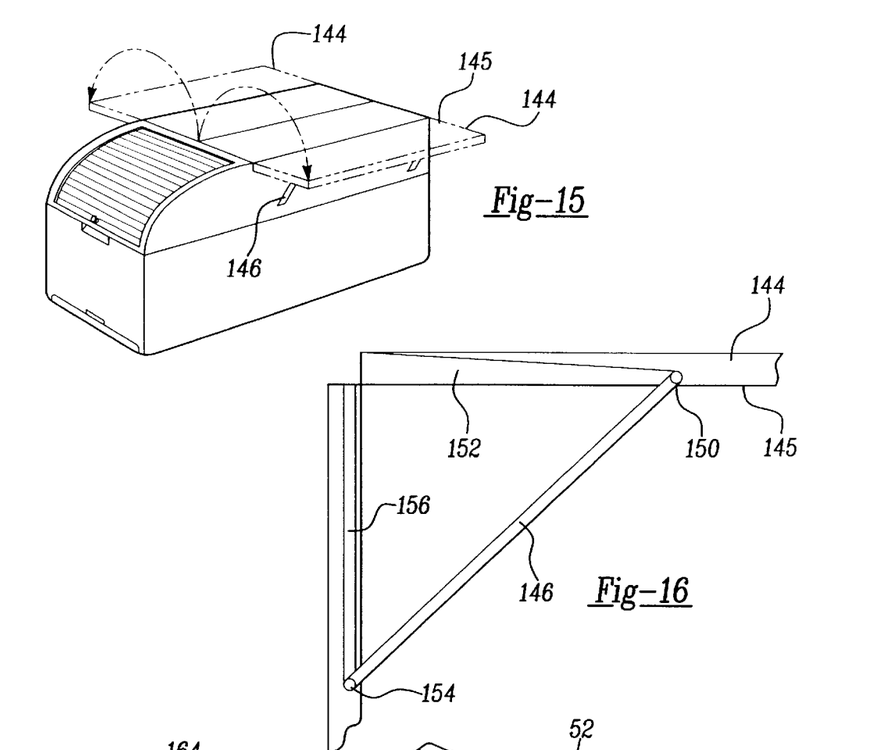
FIG. 15 is a perspective view of a fold out table for use with the console, according to the present invention.
FIG. 16 is a partial front view of the table shown in FIG. 15.

FIG. 15 discloses a lid 52 formed as a foldable table 142. The lid 52 folds out in the direction shown by the dotted lines in FIG. 15. The table 142 includes two leaves 144. Each leaf 144 includes a brace 146 which slides into a slot 148 on the console 30. The brace 146 pivots out of the leaf 144 at pivot point 150. This setup allows the table 142 to be braced for strength. FIG. 16 shows the leaf 144 and brace 146 in the open position. The outside or top surface 145 of the leaf 144 includes slots 152. As the leaf 144 folds inward, the brace 146 drops into the slot 152. The brace 146 includes a t-shaped head 154 that slides in the vertical slot 156 located on the console 30. When the leaf 144 is folded inward, the brace 146 goes into the slot 152 and is not visible.

Figures 17, 18:
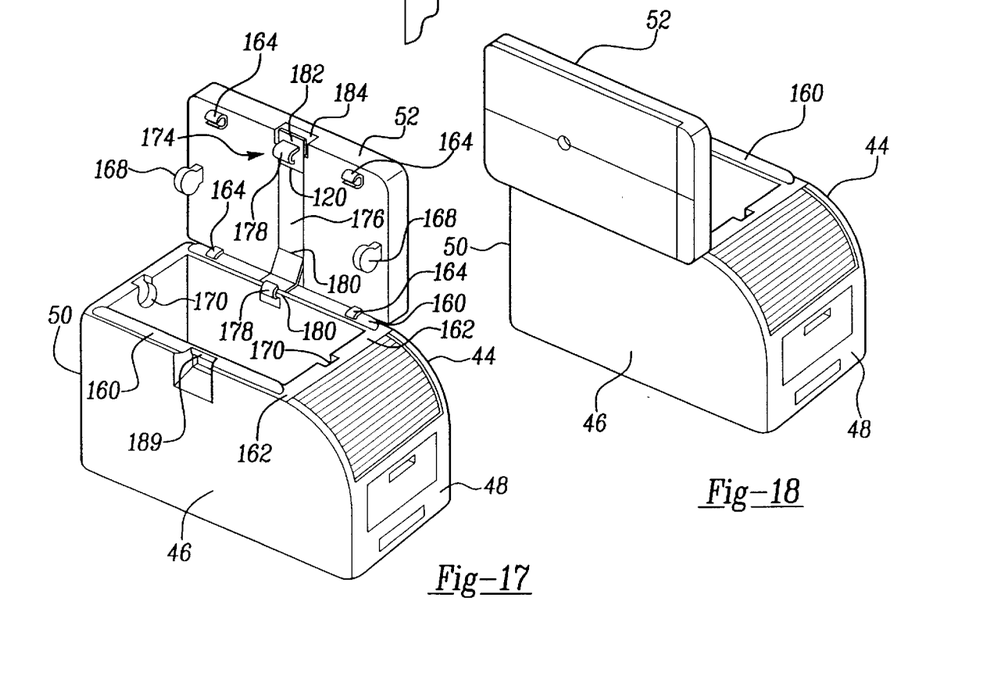
FIG. 17 is a perspective view of the console, according to the present invention, having a latch enabling the console to be opened from either side.
FIG. 18 is a perspective view of the console shown in FIG. 17 showing the console opened from the opposite side.

FIGS. 17 and 18 show the lid 52 open and pivotally connected to the first side wall 44. A pivot bar 160 is secured to the upper surface 162 of both the first side wall 44 and the second side wall 46. A pair of substantially c-shaped snap pivots 164 engage the pivot bar 160. The snap pivots 164 allow the lid 52 to open from either side. When one side is lifted, the snap pivots 164 on that side disconnect or release from the pivot bar 160 and the snap pivots 164 on the other side remain engaged to the pivot bar 160 allowing the lid 52 to rotate about that side. At the ends of the lid 52 are tabs 168 which engage key slots 170 formed in the front end 48 and rear end 50 walls of the console 30. The tab 168 and key slot 170 combination act to cushion and reduce vibration while the console 30 is moved.

In the center of the lid 52 is a lock, seen generally at 174, used to secure the lid 52 to the compartment 40. The lock 174 is typically molded into the undersurface of the lid 52. As shown in FIG. 17, a lock bar 176 having a lock arm 178 engages a pin located on the first 44 and second 46 side walls to retain the lid 52 on the console 30. It should be appreciated that the lock bar 176 operates as follows: when an upward force is applied to the lift tab 182, the lock bar 176 and corresponding lock arm 178 pivot about the crease or mold line 180. As the lift tab 182 is depressed into the gap or recess 184, the lock arm 178 pivots outward and the lock lip 188 disengages from the lock pin 189 allowing the lid 52 to be opened.

Figure 19:
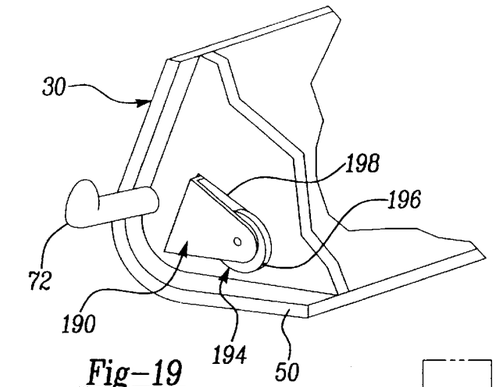
FIG. 19 is a perspective view of a wheel assembly in a folded position and secured within the console.

FIG. 19 shows an enlarged view of the wheel assembly 190 secured to the bottom 42 of the console 30. As set forth previously, a rear dock pin 72 positioned near the rear end wall 50 is used to secure the console 30 to the floor 74. The wheel assembly 190 is shown in a folded, closed position 194.

Figure 20:
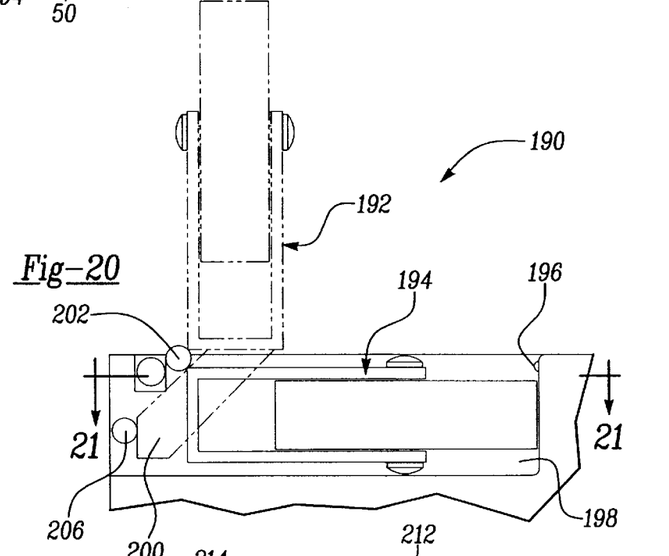
FIG. 20 is an enlarged sectional view of the wheel assembly shown in FIG. 19.
Figure 25:
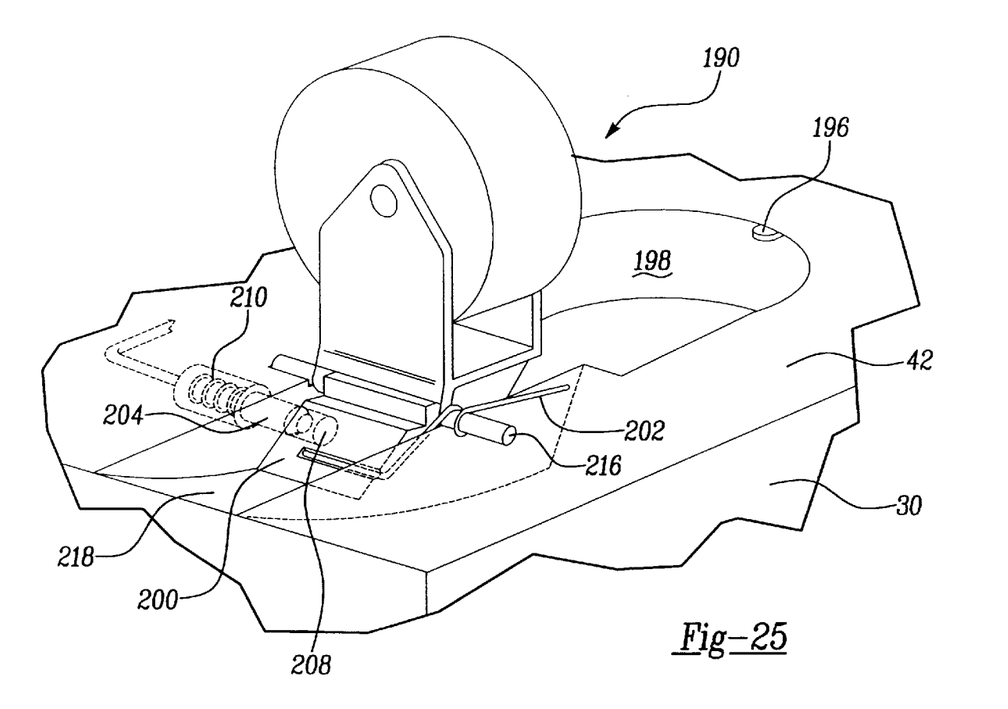
FIG. 25 is perspective view of the wheel assembly according to FIG. 19.

FIGS. 20 and 25 are enlarged views of the wheel assembly 190. The wheel assembly 190 is shown in the open position 192 and the closed position 194. In the closed position 194, a keeper flange 196 secures the wheel assembly 190 in the closed position 194. The wheel assembly 190 is stored in the wheel compartment 198. At the base of the wheel assembly 190 is an open brace 200, a brace spring 202, a lock pin 204 and a pivot hinge 206. These components cooperate to secure the wheel assembly 190 in an open position 192.

The wheel assembly 190 is shown in the open position 192 with the brace 200 and brace spring 202 in a locked position. A lock pin 204 secures the brace 200 and brace spring 202 in a locked position. The lock pin 204 is positioned in a lock pin hole 208 in the brace 200. The brace spring 202 is wrapped around a pivot pin 216. One end of the brace spring 202 is located at the back of the brace 200 and the other end rests on the bottom 42 of the console 30. The wheel assembly 190 and brace 200 are attached to the pivot pin 216 and pivot in the cavity 218.

Figure 21:
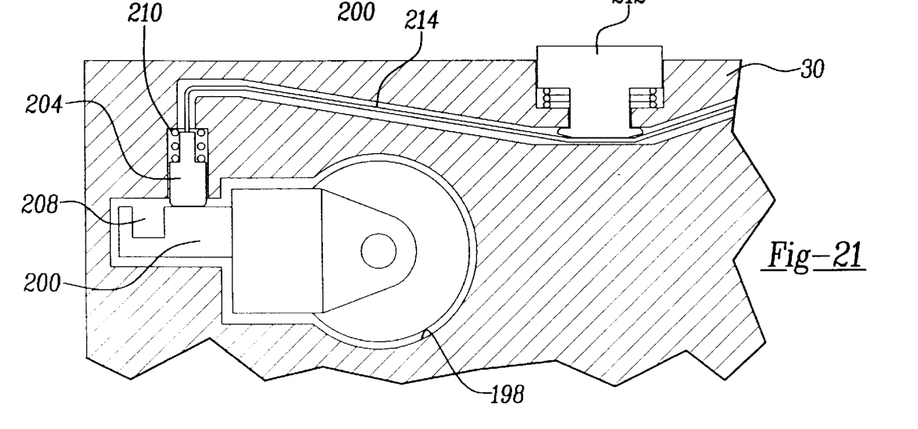
FIG. 21 is a cross-sectional view of the wheel assembly of FIG. 20 taken along lines 21—21.

FIG. 21 shows the wheel assembly 190 stored in the compartment 196. The brace 200 is in the stored position showing the lock pin hole 208 out of position with the lock pin 204. The lock pin 204 rides on the outside of the brace 200 with the lock pin spring 210 compressed. When the unlock button 212 is depressed, it acts through the release linkage 214 to pull the lock pin 204 inward allowing the wheel assembly 190 to fold up.

Figure 22:
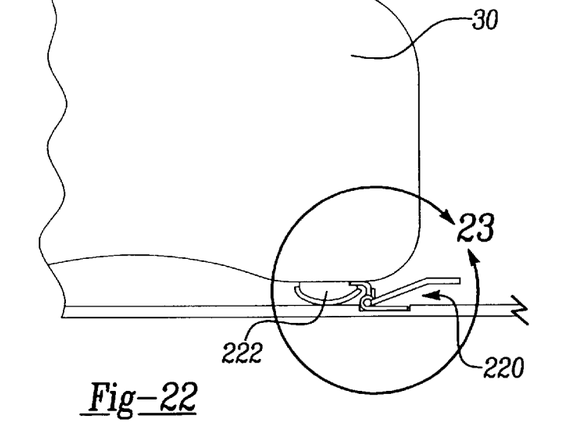
FIG. 22 is a side view of another embodiment of a front dock assembly for use with the console, according to the present invention.

FIG. 22 is a side view of the console 30 showing a front foot lock 220 near the front end wall 48.

Figure 23:
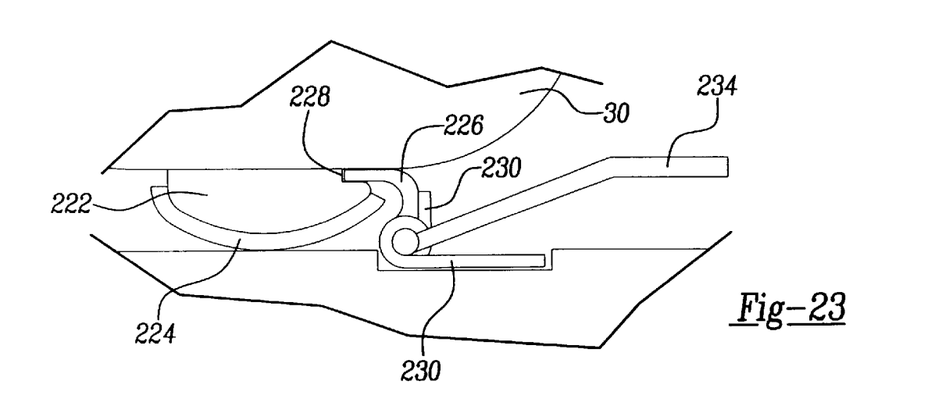
FIG. 23 is an enlarged view of the area in circle 23 of FIG. 22.
Figure 24:
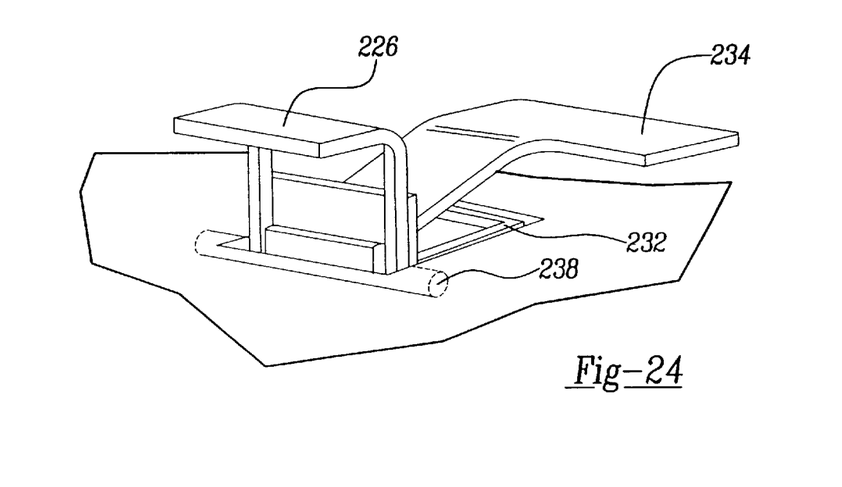
FIG. 24 is a perspective view of yet another embodiment of the front dock assembly for the console, according to FIG. 22.

As shown in FIGS. 23 and 24, the front foot 222 includes a rubber pad 224. A lock arm 226 rests into a slot 228 in the front foot 222. A return spring 230 anchored to the base 232 and at the back of the lock arm 226 urges the lock arm 226 into contact with the front foot 222. The spring 230 wraps around the pivot pin 238 and extends under the floor flange 240. An unlock pedal 234, when depressed, releases the front foot lock 220 by retracting the lock arm 226 thereby allowing movement of the console 30.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A console removably secured to a floor of a vehicle comprising:

a rectangular elongated member defining a compartment including a bottom, first side wall, a second side wall, a front end wall and a rear end wall;

a lid pivotally connected to said compartment such that said lid opens to allow access to said compartment;

a rear dock assembly positioned on said bottom including a downwardly extending rear dock pin having a lock lip thereon, said rear dock pin cooperating with a first aperture in the floor of the vehicle such that said rear dock pin extends into the first aperture and said lock lip engages a lock surface of said first aperture;

a front dock assembly positioned on said bottom and having a front dock pin including a lock lip thereon, said front dock pin extending downwardly from said bottom such that said front dock pin extends into a second aperture in the floor and said lock lip of said front dock pin engages a lock surface of said second aperture, said front dock pin pivotally secured to said bottom and operative to move between a first, engagement position and a second, release position; and a spring engaging said front dock pin and operative to urge said front dock pin into said first, engagement position.

2. A console as set forth in claim 1 including a wheel pivotally secured to said bottom, and a pivotal mount member, said mount member securing said wheel to said bottom such that said wheel can be retracted into a cavity in said bottom.

3. A console as set forth in claim 1 including a pedal attached to said front dock pin, said pedal operative to pivot said front dock pin in a direction against said spring to disengage said front dock pin from said lock surface of said second aperture.

4. A console as set forth in claim 1 including a handle attached to said console, said handle slidably fit within said console and operative to move between a first, extended position and a second, retracted position wherein when said console is removed from the floor, said handle may be extended to pull said console.

5. A console as set forth in claim 1 including said first and second side walls having an arcuate track thereon, and a roll door positioned within said track and operative to slide on said track providing access to a secondary compartment of said console.

6. A console as set forth in claim 5 including a cup holder located within said secondary compartment.

7. A console as set forth in claim 1 including a storage unit mounted in said front wall of said compartment, said storage unit containing opposing side walls interconnecting by a front surface.

8. A console as set forth in claim 1 including:
- a cup holder secured to said compartment and extending outward from said rear end wall, said cup holder including a tray slidably mounted on a pair of tracks formed in said compartment, said tray operable to move between a first, extended position and a second, retracted position, said tray having a downwardly extending flange member, said flange member having a pair of opposed apertures therein;
- a holder plate having a pair of pins adjacent the upper edge thereof, said pins engaging the apertures of said tray to pivotally connect said holder plate to said tray, said tray including an opening therein and said holder plate having a cup support cutout therein, said cup support cutout aligned with said opening.

9. A console as set forth in claim 1 including:
- a cup holder mounted within said console for movement between a retracted, closed position within said console and an extended, open position, said cup holder including a frame slidably connected to said console;
- a carrier, including an arcuate upper arm and a lower base plate, said arcuate upper arm and said base plate attached to a center pivot post; and
- a spring engaging said pivot post and operative to urge said carrier outward when said cup holder is placed in said extended, open position.

10. A console as set forth in claim 1 including:
- a lock connecting said lid to said compartment such that said lid can only be opened on one side at a time, said lock including a lock bar extending longitudinally between said first side wall and said second side wall;
- a lock arm positioned on each end of said lock bar, said lock arm engaging a lock pin positioned on each of said first side wall and said second side wall.

11. A console removably secured to a floor of a vehicle comprising:
- a rectangular, elongated member defining a compartment including a bottom, first side wall, a second side wall, a front end wall and a rear end wall,
- a lid pivotally connected to said compartment such that said lid opens to allow access to said compartment;
- a rear dock assembly positioned on said bottom including a downwardly extending rear dock pin having a lock lip thereon, said rear dock pin cooperating with a first aperture in the floor of the vehicle such that said rear dock pin extends into the first aperture and said lock lip engages a lock surface of said first aperture,
- a front dock assembly positioned on said bottom and having a front dock pin including a lock lip thereon, said front dock pin extending downwardly from said bottom such that said front dock pin extends into a second aperture in the floor and said lock lip of said front dock pin engages a lock surface of said second aperture, said front dock pin pivotally secured to said bottom and operative to move between a first, engagement position and a second, release position;
- a spring engaging said front dock pin and operative to urge said front dock pin into said first, engagement position;
- a lock connecting said lid to said compartment such that said lid can only be opened on one side at a time, said lock including a lock bar extending longitudinally between said first side wall and said second side wall;
- a lock arm positioned on each end of said lock bar, said lock arm including a lock shelf and a lock foot having a lip thereon, said lip operative to engage a lock pin positioned on each of said first side wall and said second side wall;
- wherein said lid is pivotally connected to said compartment by a first pivot bar located on said first side wall and a second pivot bar located on said second side wall;
- snap pivots located on each side of said lid and engaging said first and second pivot bars such that when one of said snap pivots is released from either of said first or second pivot bars, said lid rotating about a remaining snap pivot and pivot bar assembly.

12. A console removable secured to a floor of a vehicle comprising:
- a rectangular, elongated member defining a compartment including a bottom, first side wall, a second side wall, a front end wall and a rear end wall;
- a lid pivotally connected to said compartment such that said lid opens to allow access to said compartment;
- a rear dock assembly positioned on said bottom including a downwardly extending rear dock pin having a lock lip thereon, said rear dock pin cooperating with a first aperture in the floor of the vehicle such that said rear dock pin extends into the first aperture and said lock lip engages a lock surface of said first aperture;
- a front dock assembly positioned on said bottom and having a front dock pin including a lock lip thereon, said front dock pin extending downwardly from said bottom such that said front dock pin extends into a second aperture in the floor and said lock lip of said front dock pin engages a lock surface of said second aperture, said front dock pin pivotally secured to said bottom and operative to move between a first, engagement position and a second, release position;
- a spring engaging said front dock pin and operative to urge said front dock pin into said first, engagement position;
- a lock connecting said lid to said compartment such that said lid can only be opened on one side at a time, said lock including a lock bar extending longitudinally between said first side wall and said second side wall;
- a lock arm positioned on each end of said lock bar, said lock arm including a lock shelf and a lock foot having a lip thereon, said lip operative to engage a lock pin positioned on each of said first side wall and said second side wall; and
- a tab extending downwardly from said lid, and a key slot formed in one of said front or rear end walls, said key slot receiving said tab upon closing said lid.

13. A console as set forth in claim 12 including a resilient cushion lining said key slot, said cushion acting between said tab and said key slot to dampen vibration.

14. A console as set forth in claim 2 wherein said pivotal mount member includes a u-shaped bracket having an axle extending between opposite legs of said u-shaped bracket, said wheel mounted for rotation on said axle;

a brace attached to said u-shaped bracket by a brace shaft, said brace operative to pivot about said brace shaft, said brace shaft secured to said bottom of said compartment;

a brace spring engaging said brace and said bottom of said compartment, said spring operative to urge said brace and corresponding wheel into an upright, extended position, said brace further including a hole therein; and a lock assembly including a lock pin slidably mounted in a bore adjacent said brace, and a spring positioned within said bore and acting on said lock pin to urge said lock pin outward against said brace, said lock pin operative to engage said hole to secure said brace and corresponding wheel in said upright, extended position.

15. A console as set forth in claim 14 including a release button and a lock pin linkage connecting said release button to said lock assembly wherein actuation of said button withdraws said lock pin from the hole on said bracket and enables said wheel to be positioned in said retracted position.

16. A console removable secured to a floor an automotive vehicle comprising:

a compartment including a bottom, a first side wall, a second side wall, a front end wall and a rear end wall;

a lid pivotally connected to said compartment such that said lid opens to allow access to said compartment;

a rear dock assembly positioned on said bottom, said rear dock assembly including a downwardly extending rear dock pin including a lock lip thereon, said rear dock pin cooperating with a first aperture in the floor of the automotive vehicle such that said rear dock pin extends into the first aperture and said lock lip engages a lock surface in the floor;

a front dock assembly including a front foot pad connected to said bottom, said front foot pad having an indented portion that forms a lock ledge;

a wheel pivotally secured to said bottom;

a pivotal mount member securing said wheel to said bottom; and a lock assembly having a lock arm pivotally secured to the floor of the automotive vehicle, said lock arm moving between a first, engaged position and a second, disengaged positions wherein in said first, engaged position, said lock arm contacts said lock ledge to secure said console to the floor.

17. A console as set forth in claim 16 wherein said lock assembly includes a pivot pin extending through said floor;

a lever pivotally connected by said pivot pin to said floor;

a pedal connected to said lever, said locking arm attached to said lever; and a spring contacting said floor flange and acting on said lever to urge said locking arm into said first, engaged position.

18. A console as set forth in claim 17 wherein said pivotal mount member includes a u-shaped bracket having an axle extending between opposite legs of said u-shaped bracket, said wheel mounted for rotation on said axle;

a brace attached to said u-shaped bracket by a brace shaft, said brace operative to pivot about said brace shaft, said brace shaft secured to said bottom of said compartment;

a brace engaging said brace and said bottom of said compartment, said spring operative to urge said brace and corresponding wheel into an upright, extended position, said brace further including a hole therein; and a lock assembly including a lock pin slidably mounted in a bore adjacent said brace, and a spring positioned within said bore and acting on said lock pin to urge said lock pin outward against said brace, said lock pin operative to engage said hole to secure said brace and corresponding wheel in said upright, extended position.

19. A console removably secured to a floor of an automotive vehicle comprising:

a compartment including a bottom, a first side wall, a second side wall, a front end wall and a rear end wall;

a lid, said lid pivotally connected to said compartment such that said lid opens to allow access to said compartment;

a rear dock assembly positioned on said bottom, said rear dock assembly including a downwardly extending rear dock pin including a lock lip thereon, said rear dock pin cooperating with a first aperture in the floor of the automotive vehicle such that said rear dock pin extends into the first aperture and said lock lip engages a lock surface of said first aperture;

a front dock assembly including a front foot pad connected to said bottom, said front foot pad having an indented portion that forms a lock ledge;

a lock assembly having a lock arm pivotally secured to the floor of the vehicle, said lock arm moving between a first, engaged position and a second, disengaged position; wherein in said first, engaged position, said lock arm contacting said lock ledge to secure said console to the floor;

a wheel assembly including a u-shaped bracket having an axle and a wheel mounted for rotation on said axle;

a brace attached to said u-shaped bracket by a brace shaft, said brace operative to pivot about said brace shaft, said brace shaft secured to said bottom of said compartment;

a brace spring engaging said brace and said bottom of said compartment, said brace spring operative to urge said brace and corresponding wheel into an upright, extended position, said brace further including a hole therein;

a lock assembly including a lock pin slidably mounted in a bore adjacent said brace, and a spring positioned within said bore and acting on said lock pin to urge said lock pin outward against said brace, said lock pin operative to engage said hole to secure said brace and corresponding wheel in said upright, extended position;

a lock connecting said lid to said compartment such that said lid can only be opened on one side at a time, said lock including a lock bar extending longitudinally between said first side wall and said second side wall; and a lock arm positioned on each end of said lock bar, said lock arm engaging a lock pin positioned on each of said first side wall and said second side wall to retain said lid on said console.

* * * * *